United States Patent
Ward et al.

(10) Patent No.: US 7,094,297 B2
(45) Date of Patent: Aug. 22, 2006

(54) METHODS FOR MAKING SCREEN ASSEMBLIES

(75) Inventors: Kerry T. Ward, Cypress, TX (US); Thomas C. Adams, Hockley, TX (US); Larry Keith Clark, Willis, TX (US)

(73) Assignee: Yanco I/P, Inc., Houston, TX (US)

( * ) Notice: Subject to any disclaimer, the term of this patent is extended or adjusted under 35 U.S.C. 154(b) by 242 days.

(21) Appl. No.: 10/627,190

(22) Filed: Jul. 25, 2003

(65) Prior Publication Data

US 2005/0016674 A1    Jan. 27, 2005

(51) Int. Cl.
*B32B 37/02* (2006.01)
(52) U.S. Cl. .................. 156/64; 156/291; 156/320; 156/322; 156/311; 156/378; 156/498; 156/583.1
(58) Field of Classification Search ............... None
See application file for complete search history.

(56) References Cited

U.S. PATENT DOCUMENTS

| | | | |
|---|---|---|---|
| 3,397,633 A | 8/1968 | Harris | 156/359 X |
| 3,624,836 A * | 11/1971 | Rohdin | 219/243 |
| 3,915,775 A | 10/1975 | Davis | 156/160 |
| 4,138,303 A | 2/1979 | Taylor, Sr. | 156/264 |
| 4,968,366 A | 11/1990 | Hukki et al. | 156/153 |
| 5,032,210 A | 7/1991 | Hukki et al. | 156/359 |
| 5,312,508 A | 5/1994 | Chisholm | 156/292 |
| 5,369,246 A * | 11/1994 | Nanos | 219/388 |
| 5,417,793 A | 5/1995 | Bakula | 156/308.2 |
| 5,417,858 A | 5/1995 | Derrick et al. | 210/388 |
| 5,636,749 A * | 6/1997 | Wojciechowski | 209/403 |
| 5,690,826 A * | 11/1997 | Cravello | 210/384 |
| 5,868,889 A | 2/1999 | Kahler | 156/204 |
| 5,888,336 A | 3/1999 | Bakula et al. | 156/308.2 |
| 6,000,558 A | 12/1999 | Proux et al. | 210/486 |
| 6,056,841 A * | 5/2000 | Knokey | 156/228 |
| 6,186,337 B1* | 2/2001 | Adams et al. | 209/401 |
| 6,202,856 B1 | 3/2001 | Carr | 209/401 |
| 6,391,133 B1* | 5/2002 | Dul | 156/64 |
| 6,398,899 B1* | 6/2002 | Umezawa et al. | 156/245 |
| 6,413,334 B1* | 7/2002 | Rittner et al. | 156/64 |
| 6,699,422 B1 | 3/2004 | Stemke | 264/328.4 |
| 6,932,883 B1* | 8/2005 | Adams et al. | 156/320 |
| 2002/0000399 A1* | 1/2002 | Winkler et al. | 209/399 |
| 2003/0010437 A1* | 1/2003 | Adams et al. | 156/291 |
| 2003/0042179 A1 | 3/2003 | Adams et al. | |

FOREIGN PATENT DOCUMENTS

WO    WO 00/24560    10/1999

OTHER PUBLICATIONS

Annex To Form PCT/ISA/206. PCT App. No. PCT/GB2004/002914, 3 pp., Nov. 2, 2004.

* cited by examiner

*Primary Examiner*—Jessica Rossi
(74) *Attorney, Agent, or Firm*—Guy McClung

(57) ABSTRACT

A method for making a screen assembly for use in a vibratory separator, the method, in certain aspects, including producing a heated first screen assembly; cooling the first screen assembly while a second heated screen assembly is being made; and cooling the second screen assembly while a third heated screen assembly is being made—with heating apparatus adjacent cooling apparatuses.

12 Claims, 5 Drawing Sheets

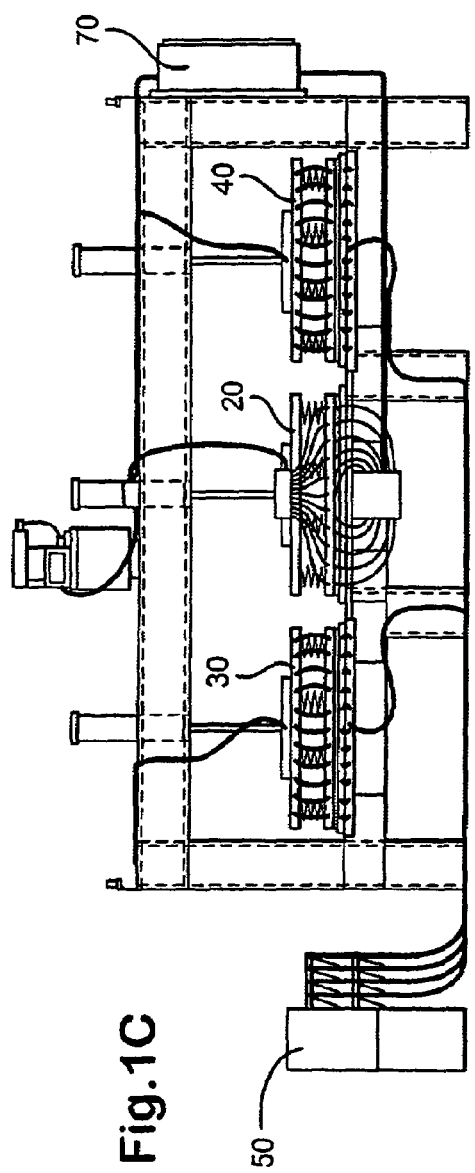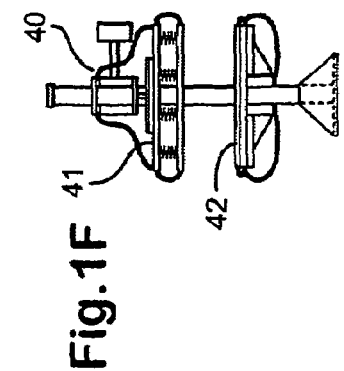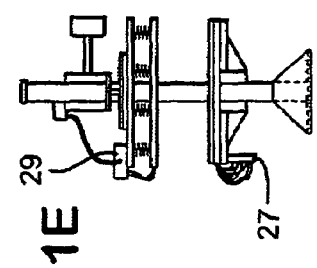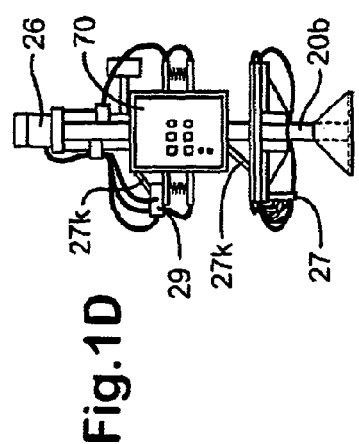

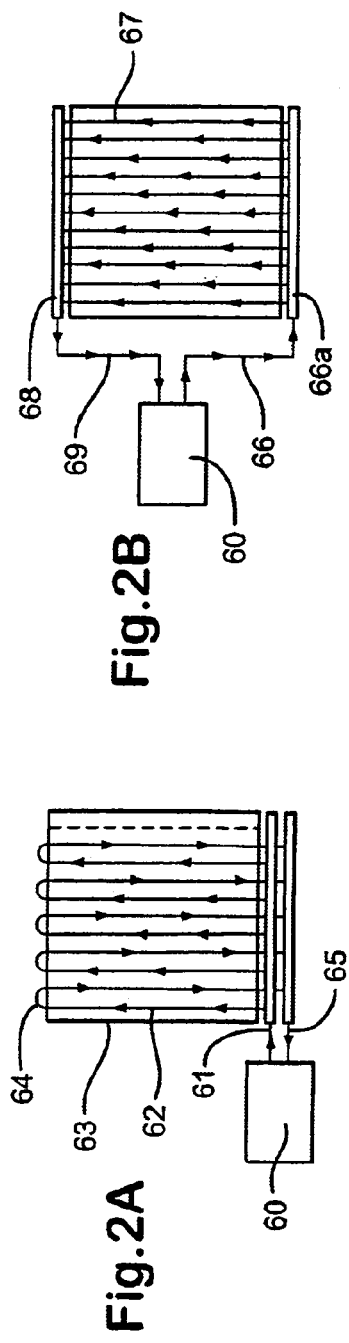
Fig.2A
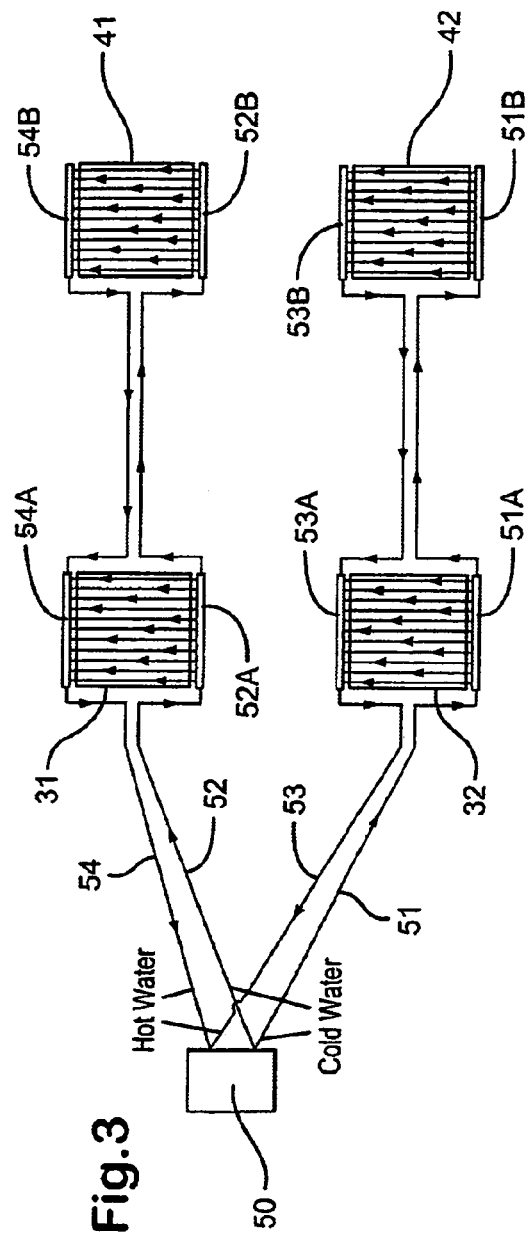
Fig.2B
Fig.3

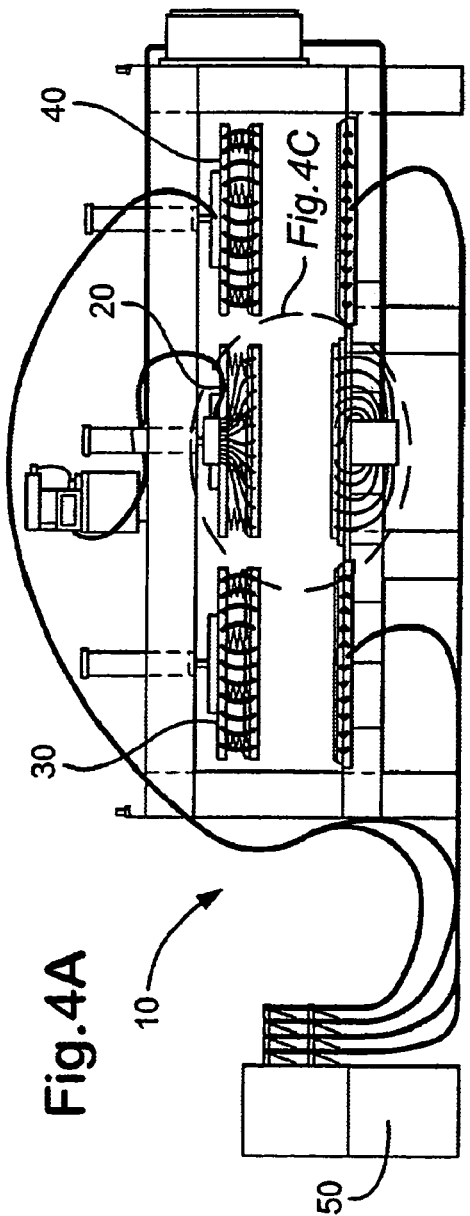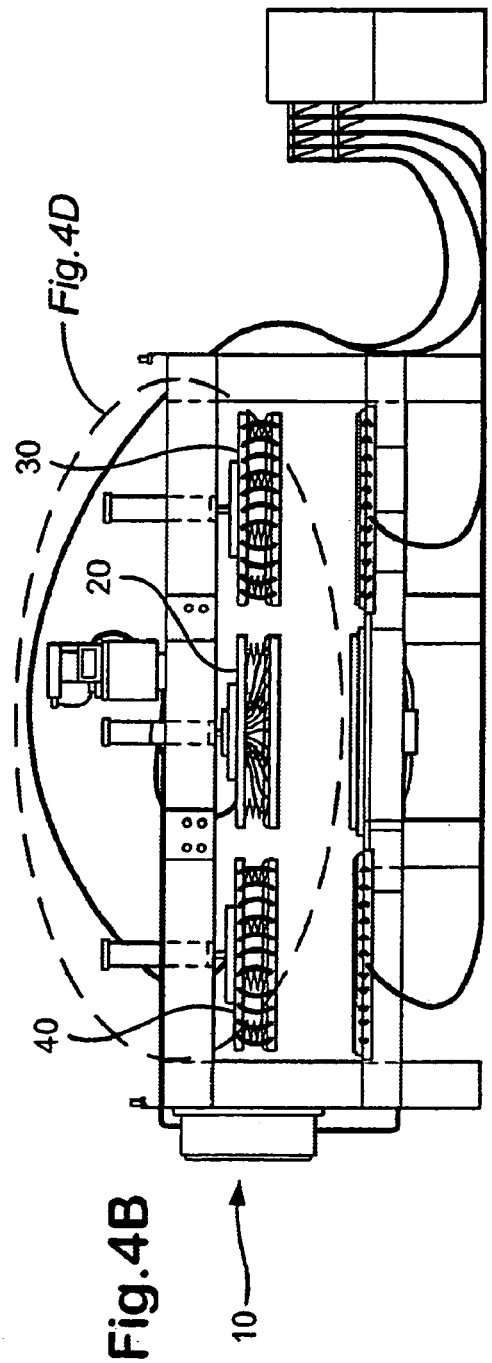

METHODS FOR MAKING SCREEN ASSEMBLIES

BACKGROUND OF THE INVENTION

1. Field of the Invention

This invention is directed to screen assemblies for vibratory separators and methods for making such screen assemblies.

2. Description of Related Art

U.S. Pat. No. 6,450,345 issued Sep. 17, 2002 and U.S. applications Ser. Nos. 10/037,474; 10/087,025; and 10/210,891 [all said patent and said applications incorporated fully herein for all purposes] disclose, inter alia, methods for making glued screen assemblies for vibratory separators and screen assemblies made by such methods. In certain aspects the glue used is hot melt glue which is allowed to cool at room temperature to complete the process of screen assembly manufacture. In many instances it takes up to twenty minutes for the glue in a screen assembly to cool so that the screen assembly can then be stored or packaged and shipped.

In certain particular known methods for making a glued screen assembly two or more layers of screening material are placed on a heated platen apparatus. One or more layers have an amount of hot melt glue thereon and heating and compressing the layers together with the apparatus glues them together with heat from the heated platen apparatus heating the glue.

There has been a need, recognized by the present inventors, for facilitating the cooling of glued screen assemblies. There has been a need, recognized by the present inventors, to reduce the time needed to process a glued screen assembly for packaging and shipment. There has been a need, recognized by the present inventors, for a method for uniformly heating screen assembly components used to make a screen assembly.

SUMMARY OF THE PRESENT INVENTION

In certain aspects, the present invention discloses a method for making a glued-together screen assembly for use in a vibratory separator, the method including gluing together at least two layers of screening material with heated glue producing a glued-together screen combination, placing the glued-together screen combination on cooling apparatus, and cooling the heated glue with the cooling apparatus. In certain embodiments, the present invention, provides methods and systems for making glued screen assemblies that include: applying glue to one, two, three or more layers of screening material and placing said layer or layers adjacent one, two, three or more other layers of screening material to glue the layers together; with suitable apparatus heating with heated platen apparatus having a movable platen or heating and compressing or forcing the layers together so that glue flows into one, two, three or more of the layers of screening material; removing the glued-together screen material layers from the apparatus; emplacing the glued-together screen material layers on cooling apparatus; and cooling the glued-together layers of screen material with the cooling apparatus.

In certain aspects, the present invention discloses a method for making a glued-together screen assembly for use in a vibratory separator, the method including producing at least one layer of screening material with a glue pattern on the surface thereof, placing the at least one layer of screening material on heating apparatus, heating the at least one layer of screening material with the heating apparatus, placing a secondary member on the at least one layer of screening material, heating together the at least one layer of screening material and the secondary member to combine the at least one layer of screening material and the at least one secondary member forming a screen assembly. In one aspect the cooling apparatus has a deck, platform, or base on which the hot glued-together layers of screen material are placed and cooling fluid is pumped through channels in the deck, etc. or channels in a body in heat transfer contact with the deck, etc. In one particular aspect cooling fluid is pumped to an inlet manifold with a plurality of channels each in fluid communication with a separate fluid channel in the deck or body. Fluid exits the separate fluid channels and flows into one main exit channel. Such fluid which has passed through the deck or body to cool the heated screen assembly can be re-cooled and pumped back to the inlet manifold in a continuous operation. Such fluid can be cooled simply by passing out of the deck or body and flowing through conduits in fluid communication with the inlet manifold or a cooling apparatus (fan, heat exchanger, chiller, radiator, etc.) can be used to cool the fluid for re-use.

In one particular aspect multiple cooling apparatuses are used adjacent and spaced-apart from a heated platen apparatus so that as a hot glued-together screen assembly or screen combination is available from the heated platen apparatus, it can be removed therefrom and placed on a cooling apparatus. For example, in certain aspects it takes three to four minutes to process a glued-together screen assembly in the heated platen apparatus, but one-and-a-half to two minutes to cool the heated glue; and two cooling apparatuses are used in conjunction with the single heated platen apparatus so that each glued-together screen assembly can be quickly removed from the heated platen apparatus and processed by an available cooling apparatus.

In certain aspects methods according to the present invention employ a heated platen apparatus according to the present invention which has a base and a movable top platen that is movable downwardly to cover a screen combination or screen-and-frame combination. The base and/or the top platen has a series of spaced-apart heating elements which can be selectively and independently activated so that different zones or areas of the screen combination or screen-and-frame combination can be heated differently. Temperature sensors measure the temperature for each zone or area so that an operator or an automatic controller can adjust the heat supplied to each zone or area. For example, outer edges of a screen combination often tend to lose heat faster than inner portions thereof and a heated platen apparatus as described above can be used to supply additional heat to these outer edges so that the entire screen combination is heated (and cools) uniformly.

It is, therefore, an object of at least certain preferred embodiments of the present invention to provide:

New, useful, unique, efficient, non-obvious methods for making screen assemblies and screen assemblies made by such methods; in certain aspects, such screen assemblies include glued-together components and/or components adhered together with epoxy material; and/or any such screen assembly is made so that it is able to withstand forces imparted thereto by a vibrating apparatus of a vibratory separator or a shale shaker.

Such methods which employ a zone-controlled heating apparatus for facilitating the application of a suitable uniform and/or effective amount of heat to each and every area of a screen combination or screen assembly to be heated and/or for facilitating uniform cooling thereof;

Such methods which facilitate the cooling of hot glue (e.g. moisture-curing hot melt glue) in glued-together screen assemblies;

Such methods which permit a first already-processed and heated screen assembly (or screen layer combination) to be cooled by a first cooling apparatus while a second screen assembly (or screen layer combination) is being heated and then the second screen assembly (or screen layer combination) is cooled by a second cooling apparatus; and Such methods which facilitate the packaging and shipment of such screen assemblies.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

FIG. 1C is a side view of the system of FIG. 1A. FIG. 1D is an end view of the system of FIG. 1A. FIG. 1E is a cross-section view along line 1E—1E of FIG. 1A. FIG. 1F is a cross-section view along line 1F—1F of FIG. 1A.

FIGS. 2A and 2B are top schematic views of fluid circulation apparatus for systems according to the present invention.

FIG. 3 is a schematic view of a fluid circulation scheme for a system according to the present invention.

DESCRIPTION OF EMBODIMENTS PREFERRED AT THE TIME OF FILING FOR THIS PATENT

Figure 1A:
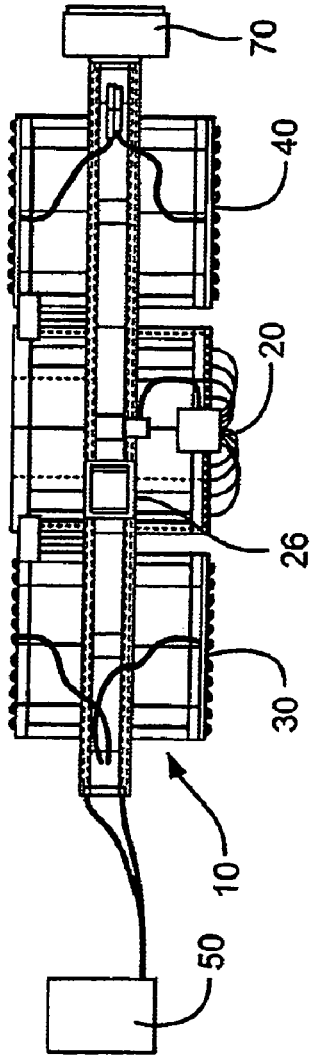
FIG. 1A is a top view of a heating and cooling system according to the present invention.
Figure 1B:
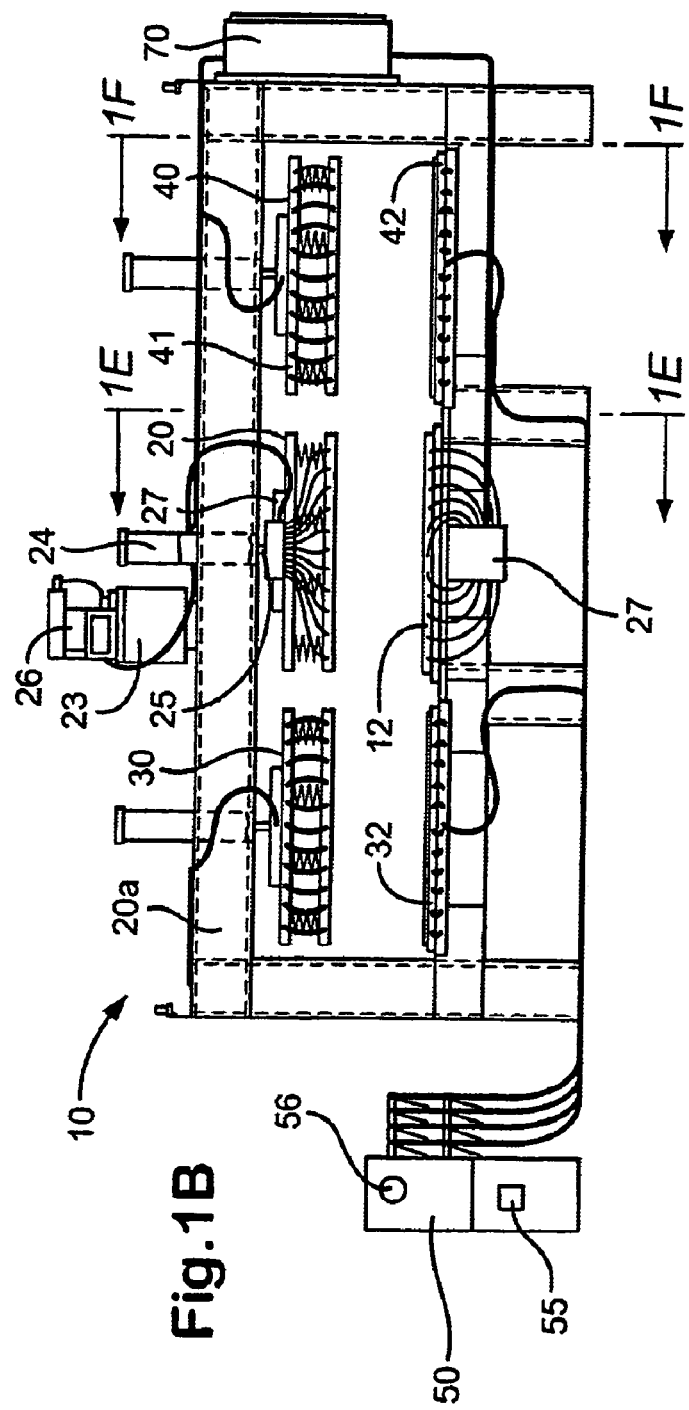
FIG. 1B is a side view of the system of FIG. 1A.

FIGS. 1A–1C show a system 10 according to the present invention which has a central heated platen apparatus 20 flanked on either side by cooling apparatuses 30 and 40. A top platen 21 of the heated platen apparatus 20 is movable downwardly to compress together layers of screening material 12 (shown schematically) on a base 22 so that glue in or on at least one of the layers is heated and flows to adjacent layer(s) to glue together the layers 12 (or, in other aspects, a powder adhesive coated frame is placed over one or more layers of screening material).

The movable top platen 21 is connected to a movement apparatus 23 which has a piston assembly 24 with a movable piston 25 to which the top platen 21 is connected. Hydraulic pump apparatus 26 connected to a support 20a selectively provides hydraulic fluid under pressure to the piston assembly 24 to move the top platen 21. As shown in FIG. 1C the top platen 21 has been moved downwardly to cover the screen material layers 12 within the heated platen apparatus.

Electrical heating systems 27 with heating elements (e.g. rods) 21h (top platen) and 22h (base) interconnected via a series of lines 28a, 28b heat the top platen 21 and the base 22. In one particular aspect, the top platen is heated to above 400° F. (in one aspect to about 450° F.) and the base is heated to about 100° F. for heating the glue on the screening material layer(s) 12. In another aspect, both the top platen and the base are heated to above 400° F. (in one aspect to about 450° F.).

Figure 4C:
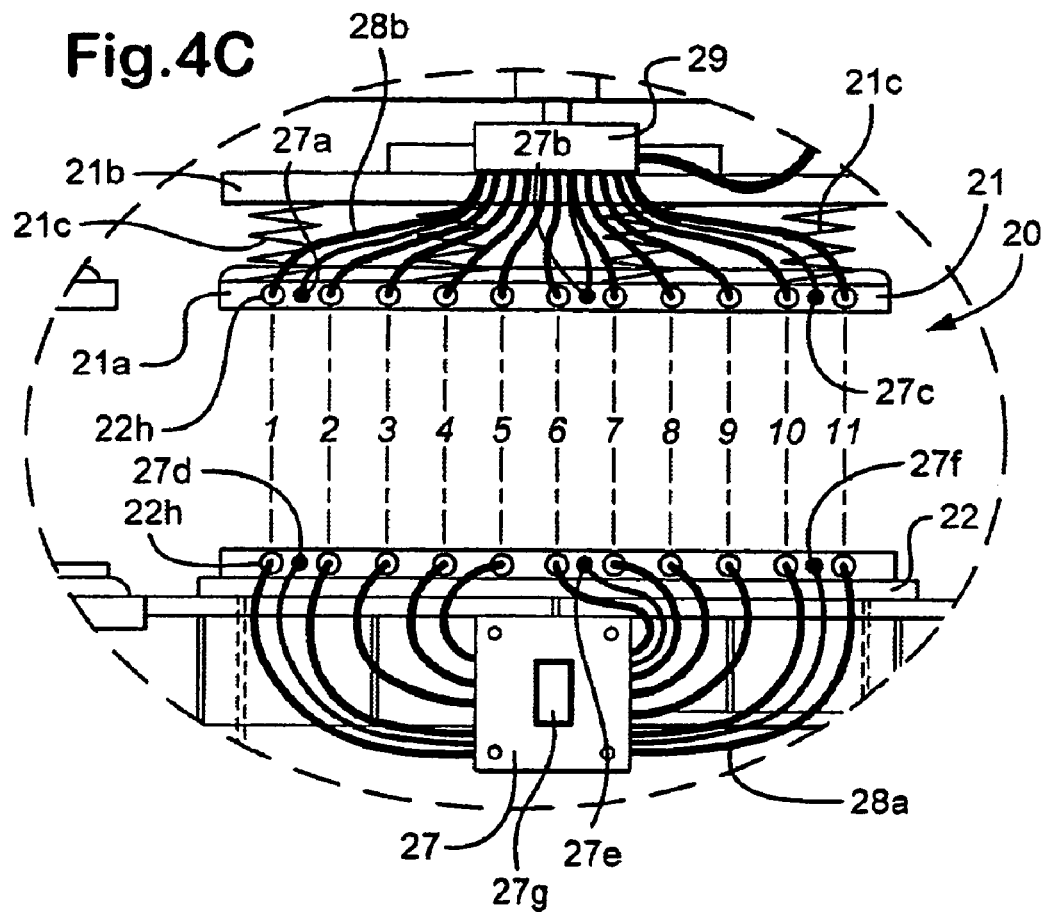
FIG. 4A is a back view of a system according to the present invention (e.g. as in FIG. 1B) indicating an enlarged portion shown in FIG. 4C.
FIG. 4B is a front view of a system according to the present invention (e.g. as in FIG. 1A) indicating an enlarged portion shown as FIG. 4D.

As shown in FIG. 4C, the lines 28a and lines for the temperature sensors for the base 22 lead to a box enclosing parts of the lower heating apparatus 27 and the lines 28b and lines for the temperature sensors for the top platen 21 lead to a junction box 29. A lower part 21a (see FIG. 4C) of the top platen 21 is, optionally, connected with a plurality of springs 21c to a top part 21b of the top platen 21. These springs 21c facilitate the application of uniform pressure onto items on the base 22. [Similarly, optionally springs interconnect a top part to a bottom part of a top platen of the cooling apparatuses 30 and 40.]

Upon raising the movable platen 21 the glued together layers 12 are removed from the base 22 and emplaced on a base 42 of the cooling apparatus 40. A movable top platen 41 is moved down to cover the screening material layers 12. In one particular aspect the cooling apparatus 40 [in an environment with an ambient temperature above 90° F.] cools—with the top platen and base at about 65° F.—the heated screening material layers 12 to about 88° F. in about 2 to 4 minutes.

Cooled fluid for cooling heated layers of screening material is provided continuously by a cooling system 50 which includes a cooling system 56 (e.g. a chiller unit) and pumping apparatus 55. In one particular aspect such a cooling system is a PCP 500 A model commercially available from Filtrins Mfg. Company. Cooled fluid (e.g. cooled water or antifreeze) (shown schematically in FIG. 3) is pumped from the system 50 in a line 51, to lines 51A and 51B, and from them to the bases 42 and 32, respectively, of the cooling apparatuses 40 and 30. Fluid (e.g. hotter water or antifreeze) exits the base 42 through a line 53B and the base 32 through line 53A which are in fluid communication with a return line 53 connected to and in fluid communication with the system 50. The returned fluid is re-cooled and then pumped back to the cooling apparatuses 30, 40 by the pump apparatus 55.

Cooled fluid is provided to the top platens 31, 41 from a line 52 and lines 52A, 52B. Fluid that has flowed through the top platens 31, 41 flows back to the system 50 via lines 54A, 54B, respectively, and a line 54.

Once the original screening material layers 12 have been moved from the heating apparatus 20, another set of such layers is emplaced on the base 22, the top platen 21 is lowered and the new screening material layers are heated. When the top platen 21 is then raised, the heated screening material layers are emplaced on the base 32 of the cooling apparatus 30. By the time yet another third set of screening material layers has been heated by the heating apparatus 20, the original screening material layers 12 have been cooled in the cooling apparatus 40 and the third set of heated screening material layers is moved from the heating apparatus 20 to the cooling apparatus 40 for cooling.

FIG. 1C illustrates all three apparatuses 20, 30, 40 simultaneously in use with top platens in the lower positions. Two sets of layers of screening material—each set previously heated by the heating apparatus 20—are each being cooled, one in the cooling apparatus 30 and one in the cooling apparatus 40. A third set of layers of screening material is, at the same time, being heated in the heating apparatus 20.

FIG. 2A shows one embodiment of a flow system for flowing cooling fluid through a base (e.g. a base line the bases 32, 42 described above) or for flowing cooling fluid through a top platen of a cooling apparatus (e.g. like the top platens 31, 41).

As shown in FIG. 2A cooled fluid from a cooled fluid system 60 (e.g. but not limited to, like the system 50 described above or any suitable known system for providing cooled fluid) flows out in a line 61 and then from the line 61 in sub-lines 62 which pass through a member 63 (e.g. a base or top platen as described above). Via loop ends 64 (which may be outside the member 63 as shown or within the member 63) the fluid flows back to a return line 65. The return line 65 is in fluid communication with the system 60 and the fluid from the member 63 flows back into the system 60 via the return line 65 for re-cooling and re-introduction into the line 61.

FIG. 2B illustrates an alternative flow scheme in which cooled fluid from the cooled fluid system 60 flows in a line 66 to a manifold 66a. Fluid flows in sub-lines 67 which are in fluid communication with the manifold 66a across the member 63 to a return manifold 68. From the return manifold 68 fluid flows to a return line 69 and then back to the system 60 for re-cooling and re-use.

FIG. 1D illustrates a control panel 70 with controls for controlling the heating apparatus 20. The control panel 70 is interconnected via lines in conduits 27K (shown schematically, FIG. 1D) with heating apparatuses 27 and the temperature sensors and includes controls for setting and controlling the temperature of the top platen 21 and the base 22.

FIG. 4C shows the heated platen apparatus 20 (see FIGS. 1A–1C). Both the top platen 21 and the base 22 have a series of heat rods in channels therethrough from one side to the other labelled with numerals from 1 to 11 in FIG. 4C in which are positioned the heating elements $21h$, $22h$. Six thermal sensors, $27a$–$27f$, in the top platen 21 ($27a$–$27c$) and the base 22 ($27d$–$27f$) provide measurements of temperature for the edges and mid-portion of a screen layer combination on the base 22 during heating of he screen layer combination.

Each sensor $27a$–$27f$ is in communication with control apparatus $27g$ of the heater system 27 and with the controls of the control panel 70. Upon sensing a temperature of a screen layer combination via one of the sensors $27a$–$27f$, the heater system 27 can, if needed, increase (or decrease) the temperature at the zone or area corresponding to the particular sensor to insure that that zone or area of the screen layer combination is appropriately (and in particular cases uniformly) heated. For example, in one particular situation, if one or both outer edges (as viewed in FIG. 4C) of a screen layer combination adjacent channels 1, 2 and 10, 11 cool too quickly or heat up too slowly (as indicated by one or all of sensors $27a$, $27c$, $27d$, and/or $27f$) additional heat is supplied via the corresponding channels so that the screen layer combination is uniformly heated. It is also within the scope of the present invention to use the heating apparatus 20 to heat different zones or areas of a screen layer combination differently.

Figure 4D:
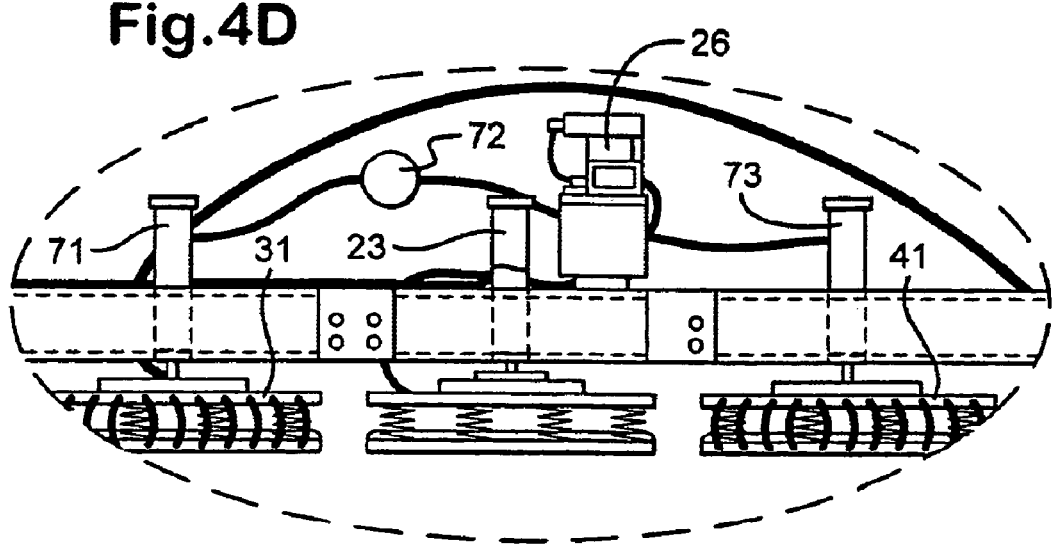

FIG. 4D shows part of the system 10 in detail. The hydraulic pump apparatus 26 provides power for the movement apparatus 23, which, in one aspect, applies about 450 p.s.i. to items on the base 22. Pneumatic apparatuses 71 and 73 move the top platens 31 and 41 respectively. Air under pressure is supplied to the pneumatic apparatuses 71 and 73 by an air compressor apparatus 72 (shown schematically) or other suitable air supply system.

In certain particular aspects of methods according to the present invention the temperature of the base 22 is set at about 100° F. and the temperature of the top platen 21 is set at about 450° F. A single layer of coarse mesh (e.g. 10 to 20 mesh) screen with a pattern of spaced-apart lines thereon of moisture-curing hot melt glue (which may or may not have been previously cured for several hours or days) is treated on the apparatus 20 (screen on base, top platen lowered) for about 30 seconds to one minute to soften the hot melt glue and the wire mesh. The top platen is then raised and a frame (e.g. but not limited to, a unibody frame or a frame made of channel or tubular members or rods) is placed on top of the coarse mesh layer. The frame is coated with a powderized adhesive, e.g. known powder epoxy material. The top platen is then lowered and the powderized adhesive, following heating, flows down onto the wire of the coarse mesh layer. After about six to eight minutes, the top platen is raised and the frame-coarse-mesh combination remains on the heated base until substantially all of the epoxy material is "set up" or hardened. By raising the top platen after a certain time period (e.g. six to eight minutes or whatever is required) the hot melt glue is not permitted to heat to such a level that it degrades or burns. Therefore, the top platen is raised so that the epoxy material can continue to heat to a point at which good encapsulation of wires of the coarse mesh layer is accomplished, but with no or minimal degradation of the hot melt glue in the coarse mesh layer. In another aspect, instead of a single coarse mesh layer, a combination of two, three or more glued-together layers (any disclosed or referred to herein; e.g., with layers glued-together with moisture-curing hot melt glue) are initially placed on the base of the heating apparatus 20. The resulting screen assembly can be cooled on one of the cooling apparatuses.

In another aspect, a coarse mesh layer with a pattern (any disclosed or referred to herein) of moisture-curing hot melt glue thereon is placed on the base 22, heated for about 30 seconds, then one or two layers of fine screening mesh are placed on top of the coarse mesh layer and the top platen is lowered to heat the combination of the three layers. The top platen is then raised, the screen layer combination is moved to one of the cooling apparatuses, and the heating apparatus begins to treat another screen layer combination.

In one particular embodiment of a method according to the present invention, a layer of coarse mesh (10 to 20 mesh) with hot melt glue thereon is placed on a layer of fine mesh (38–400 mesh) which is on a layer of fine mesh (30 to 325 mesh). Either or both layers of fine mesh may also have hot melt glue thereon. This multi-layered combination is placed on a base of a heating apparatus according to the present invention with the base at a temperature between 400 to 440° F. (in one aspect on a base as shown in FIG. 4C the heating elements for the channels 1, 2, 10, and 11 are heated to between 415 and 440° F. and the remaining heating elements are heated to between 400 and 440° F. The top platen is lowered onto the multi-layered combination which is heated for about 3 to 5 minutes. The top platen is then raised and the glued-together combination is moved to one of the cooling apparatuses and, in one aspect, another multi-layered combination is simultaneously placed on the base of the heating apparatus.

Any screen assembly made according to the present invention may be a screen assembly for use on a vibratory separator and, in one particular aspect, a screen assembly for use on a shale shaker used for treating drilling fluid with drilled cuttings, debris, and/or contaminants therein, such a screen assembly able to withstand vibratory forces imparted thereto by vibration apparatus of the vibratory separator or shale shaker.

The present invention, therefore, in at least some, but not necessarily all embodiments, provides a method for making a screen assembly [in one aspect, a glued-together screen assembly] for use in a vibratory separator, the method including producing at least one layer of screening material with a glue [or adhesive] pattern on the surface thereof, placing the at least one layer of screening material on heating apparatus, heating the at least one layer of screening material with the heating apparatus, optionally placing a secondary member on the at least one layer of screening material, heating together the at least one layer of screening material [when this is more than one layer] and/or the secondary member [when one is present] to combine the at least one layer of screening material and the at least one secondary member forming a first screen assembly. Such a method may include one or some, in any possible combination, of the following: wherein the at least one layer of screening material is or includes a layer of coarse mesh; wherein the pattern is glue and glue of the pattern on the at least one layer of screening material is cured glue prior to placing the at least one layer of screening material on the heating apparatus; wherein glue of the pattern is moisture-curing hot melt glue; wherein the at least one layer of screening material is heated sufficiently to soften glue of the glue pattern; wherein the secondary member is at least one layer of secondary screening material; wherein the secondary screening material includes a fine mesh; wherein the at least one layer of secondary screening material is two layers of secondary screening material; wherein the two layers of secondary screening material are glued together; wherein the secondary member is a frame for a screen assembly; wherein the frame is an array of tubular members; wherein the frame is coated with adhesive material; wherein the frame [or a frame and a secondary member] is heated sufficiently so that at least some of the adhesive material flows onto the at least one layer of screening material to adhere together the secondary member and the at least one layer of screening material; wherein the adhesive material is powderized epoxy material; removing the first screen assembly from the heating apparatus, emplacing the first screen assembly on first cooling apparatus adjacent the heating apparatus, and cooling the first screen assembly with the cooling apparatus; while the first screen assembly is cooling, forming a second screen assembly as described above; removing the second screen assembly from the heating apparatus, emplacing the second screen assembly on second cooling apparatus, and cooling the second screen assembly with the second cooling apparatus; while the second screen assembly is cooling, forming a third screen assembly as described above; and/or wherein the screen assembly is able to withstand vibratory forces imparted to a screen assembly by vibration apparatus of a vibratory separator or shale shaker.

The present invention, therefore, in at least some, but not necessarily all embodiments, provides a method for making a glued-together screen assembly for use in a vibratory separator, the method including gluing together at least two layers of screening material with heated glue producing a glued-together screen combination, placing the glued-together screen combination on cooling apparatus, and cooling the heated glue with the cooling apparatus. Such a method may include one or some, in any possible combination, of the various aspects referred to in the previous paragraph.

The present invention, therefore, in at least some, but not necessarily all embodiments, provides a screen assembly made by any of the methods described above.

The present invention, therefore, in at least some, but not necessarily all embodiments, provides a method for making a screen assembly for use in a vibratory separator, the method including producing at least one layer of screening material with adhesive or glue thereof, placing the at least one layer of screening material on heating apparatus, heating the at least one layer of screening material with the heating apparatus, placing a frame on the at least one layer of screening material on the heating apparatus, heating together the at least one layer of screening material and the frame to combine the at least one layer of screening material and the frame forming a screen assembly. Such a method may include placing a secondary member on the frame which becomes part of the screen assembly.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. Any patent or patent application referred to herein is incorporated fully herein for all purposes. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims. All patents referred to herein are incorporated fully herein for all purposes.

What is claimed is:

1. A method for making a glued-together screen assembly for use in a vibratory separator, the method employing a heating apparatus, the heating apparatus comprising a control system, a plurality of heating elements spaced-apart on the heating apparatus, and a plurality of heat sensors, the plurality of heat sensors spaced-apart and movable to a position adjacent the at least one layer of screening material, the plurality of heat sensors in communication with the control system, the method comprising producing at least one layer of screening material with glue on the surface thereof, placing the at least one layer of screening material on the heating apparatus, heating the at least one layer of screening material with the heating apparatus, placing a secondary member on the at least one layer of screening material, sensing with the plurality of heat sensors temperatures of different portions of the at least one layer of screening material during heating thereof, controlling the plurality of spaced-apart heating elements with the control system in response to temperatures sensed by the plurality of heat sensors to control heat applied to the different portions of the at least one layer of screening material during heating thereof, and heating together the at least one layer of screening material and the secondary member to combine the at least one layer of screening material and the at least one secondary member forming a first screen assembly.

2. The method of claim 1 further comprising controlling the plurality of spaced-apart heating elements to uniformly heat the at least one layer of screening material.

3. The method of claim 1 further comprising the at least one layer of screening material comprising a plurality of layers of screening material.

4. The method of claim 1 wherein the at least one layer of screening material is a layer of coarse mesh.

5. The method of claim 1 wherein glue on the at least one layer of screening material is cured glue prior to placing the at least one layer of screening material on the heating apparatus.

6. The method of claim 1 wherein the glue is moisture-curing hot melt glue.

7. The method of claim 1 further comprising removing the first screen assembly from the heating apparatus, emplacing the first screen assembly on first cooling apparatus adjacent the heating apparatus, and cooling the first screen assembly with the first cooling apparatus.

8. The method of claim 1 wherein the secondary member is a frame for a screen assembly.

9. The method of claim 8 wherein the frame comprises an array of tubular members.

10. The method of claim 8 wherein the frame is coated with adhesive material.

11. The method of claim 10 wherein the secondary member is heated sufficiently so that at least some of the adhesive material flows onto the at least one layer of screening material to adhere together the secondary member and the at least one layer of screening material.

12. The method of claim 10 wherein the adhesive material is powderized epoxy material.

* * * * *